Aug. 19, 1952

E. C. RAINEY 2,607,165

ELECTRIC PLANT THINNING APPARATUS

Filed May 21, 1946

INVENTOR.
EARL CECIL RAINEY.
BY
J. H. Weatherford
Atty.

Patented Aug. 19, 1952

2,607,165

UNITED STATES PATENT OFFICE 2,607,165

ELECTRIC PLANT THINNING APPARATUS

Earl Cecil Rainey, Crittenden County, Ark.

Application May 21, 1946, Serial No. 671,345

1 Claim. (Cl. 47—1.3)

This invention relates to the cultivation of plants, and has special relation to the destruction of undesirable weeds and plants in order that the remaining portion may better thrive and grow.

Many varieties of plants are seeded in rows and after they reach a few inches in height the larger portion of the plants are cleaned out, leaving individual hills in which one or more plants remain, this ordinarily being done by chopping and being a very laborious process, or by burning, a method damaging the remaining plants.

The objects of the present invention are:

To clear out these intervening plants, and at times, adjacent rows of strips of plants on either side of the row of hills, in simple and effective manner, largely eliminating hand labor.

In accomplishing these objects I establish an electric arc substantially horizontally across the row of plants and other vegetation which is to be destroyed, and where it is desired, to leave individual hills of plants at uniform intervals for further growth and cultivation, I interrupt the arc for the desired length of time where the plants are to remain, and having passed them, reestablish the arc.

The method by which the foregoing and other objects are accomplished will readily be understood from the following specification upon reference to the accompanying drawings, in which.

Figure 1:
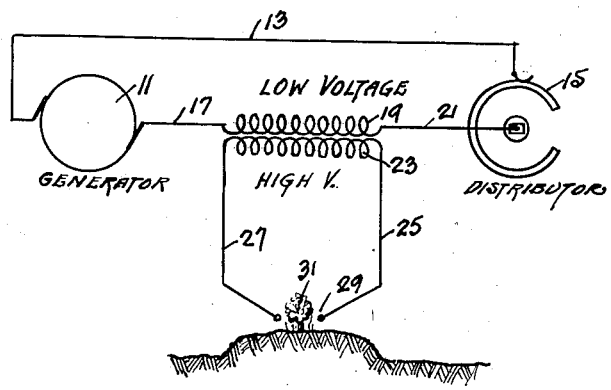
Fig. 1 is a cross section of a row of plants with a diagrammatic view of an electric circuit and arc established thereby.
Figure 2:
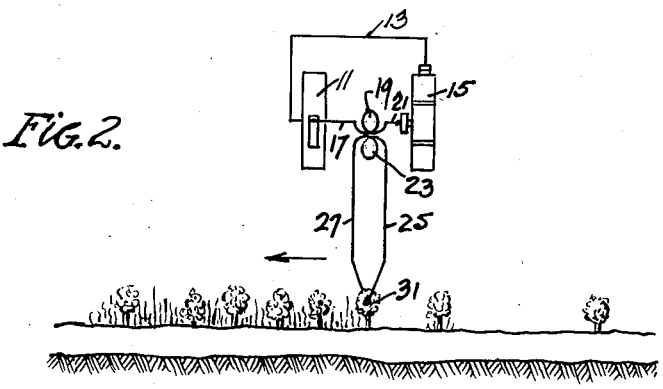
Fig. 2 is a side elevation along the row of plants showing a portion of the row cleaned out and the remaining portion as it appears before clearing, with a diagrammatic view of the circuit through which clearing is accomplished.

Referring now to the drawings in which the various parts are indicated by numerals:

11 is a source of current symbolically illustrated as a generator. 13 is a lead from one pole of this generator to an interrupter or distributor 15. 17 is a lead from the opposite pole of the generator to the low voltage side 19 of a transformer, and 21 a continuing lead to the distributor completing the low voltage circuit of the transformer.

23 is a high voltage side of the transformer, from which leads 25 and 27 extend to a spark gap 29 having discharge poles which are spaced to permit the passage of the plants and vegetation 31 of the row therebetween. The distributor 15 is rotated in synchronism with the movement of the arc along the row of plants so that from time to time contact of the lead 13 with the distributor is broken and the flow of current interrupted; at other times the current flowing through the distributor and maintaining the arc through which destruction of the plants is accomplished.

It will readily be understood that if the distributor is stopped with the lead 13 in contact there will be a continuous flow of current and a continuous maintenance of the arc and continuity of plant destruction, as where a strip of plants or other vegetation along one or the other side of the row is to be destroyed.

In carrying out the method, current is generated at convenient voltage, ordinarily of the nature of a few hundred volts, and interruption of the circuit is accomplished at such low voltage in order to avoid arcing, the amperage being very low, ordinarily of the nature of one ampere, and in the transformer the voltage is stepped up into the thousands of volts necessary to cause the current to jump from pole to pole of the spark gap and establish the arc.

In ordinary use, the poles establishing the spark gap are traversed along a row of plants, portions of which are to be destroyed, and flow of current established setting up an arc between the poles which is interrupted at uniform intervals by the distributor.

I claim:

Apparatus adapted for transfer along a plant row in order to electrically destroy undesired plant life therein, said apparatus including a low voltage generator, a circuit interrupter including a rotary contact part interrupted by a relatively short gap, a step-up transformer, leads extending from said generator through said interrupter and the low voltage side of said transformer establishing a low voltage make and break circuit, and a high voltage circuit including the high voltage side of said transformer and leads therefrom terminating in poles laterally spaced to establish a spark gap and permit passage of plants to be destroyed between said poles, said circuit interrupter being synchronized with movement of said apparatus along said row.

EARL CECIL RAINEY.

REFERENCES CITED

The following references are of record in the file of this patent:

UNITED STATES PATENTS

| Number | Name | Date |
|---|---|---|
| 439,176 | Pace | Oct. 28, 1890 |
| 546,682 | Scheible | Sept. 24, 1895 |
| 1,088,969 | Cox | Mar. 3, 1914 |
| 1,843,187 | Wood | Feb. 2, 1932 |
| 2,007,383 | Opp | July 9, 1935 |
| 2,365,576 | Meaker | Dec. 19, 1944 |

FOREIGN PATENTS

| Number | Country | Date |
|---|---|---|
| 491,348 | France | Jan. 30, 1919 |
| 2,968 | Australia | Sept. 20, 1921 |